(12) United States Patent
Endo et al.

(10) Patent No.: US 9,764,625 B2
(45) Date of Patent: Sep. 19, 2017

(54) VEHICLE DOOR

(71) Applicant: HONDA MOTOR CO., LTD., Tokyo (JP)

(72) Inventors: Satoshi Endo, Saitama (JP); Hiromu Inoue, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/026,797

(22) PCT Filed: Jun. 25, 2014

(86) PCT No.: PCT/JP2014/066775
§ 371 (c)(1),
(2) Date: Apr. 1, 2016

(87) PCT Pub. No.: WO2015/049902
PCT Pub. Date: Apr. 9, 2015

(65) Prior Publication Data
US 2016/0214468 A1 Jul. 28, 2016

(30) Foreign Application Priority Data

Oct. 4, 2013 (JP) ................................. 2013-208924

(51) Int. Cl.
*B60J 5/04* (2006.01)
*B60R 13/04* (2006.01)
(Continued)

(52) U.S. Cl.
CPC ............... *B60J 5/0402* (2013.01); *B60J 5/04* (2013.01); *B60J 10/265* (2016.02); *B60J 10/74* (2016.02); *B60R 13/04* (2013.01)

(58) Field of Classification Search
CPC ... B60J 5/0402; B60J 5/04; B60J 10/74; B60J 10/265; B60R 13/04
(Continued)

(56) References Cited

U.S. PATENT DOCUMENTS

| 2001/0015035 A1* | 8/2001 | Nozaki | B60J 10/21 49/440 |
| 2005/0204634 A1* | 9/2005 | Nozaki | B60J 10/79 49/441 |

(Continued)

FOREIGN PATENT DOCUMENTS

| JP | S58-68313 | 5/1983 |
| JP | S61-50023 | 4/1986 |

(Continued)

OTHER PUBLICATIONS

Chinese Office Action dated Jan. 18, 2017 (English translation included).

*Primary Examiner* — Jason S Morrow
*Assistant Examiner* — E Turner Hicks
(74) *Attorney, Agent, or Firm* — Rankin, Hill & Clark LLP

(57) ABSTRACT

A vehicle door manufactured at a low cost and providing a flush feeling of a vehicle, wherein a front door includes a door body, a door sash, and door glass, the door sash including a receiving part receiving the door glass, and a molding adjacent to an outside surface of the vehicle body around a door opening, the molding including an outside wall being a wall part at a vehicle outer side of the receiving part, and an inclined wall inclining inward a vehicle as getting closer to a parting line, wherein an outer surface of the outside wall is positioned more outside a vehicle than the parting line, and a distal edge of the inclined wall is positioned more inside a vehicle than the parting line, or included in a tangent plane to the outer surface of the vehicle body near the parting line.

16 Claims, 7 Drawing Sheets

(51) Int. Cl.
*B60J 10/265* (2016.01)
*B60J 10/74* (2016.01)

(58) Field of Classification Search
USPC .......................... 296/190.11, 146.9, 93, 1.08
See application file for complete search history.

(56) References Cited

U.S. PATENT DOCUMENTS

| | | | |
|---|---|---|---|
| 2005/0223648 A1* | 10/2005 | Takeuchi | B60J 5/0402 49/502 |
| 2009/0115220 A1* | 5/2009 | Takeuchi | B60J 5/0402 296/146.6 |
| 2010/0181798 A1* | 7/2010 | Takeuchi | B60R 13/04 296/146.5 |
| 2011/0099912 A1* | 5/2011 | Ohtake | B60J 5/0402 49/502 |
| 2012/0192498 A1* | 8/2012 | Fukui | B60J 5/00 49/504 |
| 2013/0219799 A1* | 8/2013 | Takeuchi | B60J 10/04 49/472 |

FOREIGN PATENT DOCUMENTS

| | | |
|---|---|---|
| JP | 62-11697 | 3/1987 |
| JP | H0556544 | 7/1993 |
| JP | 2013-082284 | 5/2013 |

* cited by examiner ained or is configured such that when the door body is in the closed state and in a region along at least a roof of the vehicle body, the outer surface of the outside wall is positioned more outside the vehicle than the parting line, and that the distal edge of the inclined wall is positioned more inside the vehicle than the parting line or included in the tangent plane to the outer surface of the vehicle body in the vicinity of the parting line.

VEHICLE DOOR

TECHNICAL FIELD

The present invention relates to a vehicle door attached to a vehicle body.

BACKGROUND ART

A door sash for receiving door glass of a vehicle and guiding vertical movements of the door glass is known. The door sash is a polygonal line-shaped frame mounted into a door body which is openable and closable with respect to a door opening of a vehicle, and is manufactured by roll forming, for example.

The door sash greatly affects the design feature of the vehicle as the outer surface thereof is exposed (or covered with a molding). Thus, a door sash configured in consideration of such a design feature is proposed.

For example, Patent Literature 1 discloses a door sash formed so as to be continuous to the same curved surface with respect to a roof and a drip rail to which an edge of the roof is coupled.

Patent Literature 2 discloses a vehicle door including a guide-projection body attached to outer surfaces of the cover member and the rear guide rail.

CITATION LIST

Patent Literature

Patent Literature 1: Japanese Unexamined Utility Model Registration Application Publication No. S61-50023
Patent Literature 2: Japanese Unexamined Utility Model Registration Application Publication No. S58-68313

SUMMARY OF INVENTION

Technical Problem

In the configuration described in Patent Literature 1, a run channel which seals a gap between the door glass and the door sash is held by a holding part having a U-shape in a cross-sectional view. Therefore, in a case where the door sash is mounted to be continuous to the same curved surface, with respect to the roof and the drip rail a step difference corresponding to a thickness of the holding part and the run channel is produced between an outside surface of the door glass and an outside surface of the door sash.

That is, an outside surface of the door glass in a vicinity of the roof has a shape getting deeper into the vehicle inside than the outer surface of the roof in a vicinity of the outer door glass. Thus, there is a problem that a flush feeling (smoothness of the outer shape) of the vehicle as a whole is hard to produce.

In the configuration described in Patent Literature 2, a flush feeling may be produced by installing the guide-projection body on outer surfaces of the cover member and the rear guide rail, but there is a problem that installing the guide-projection body increases manufacturing cost and man-hour.

In view of the above problems, it is an object of the present invention to provide a vehicle door that exhibits a flush feeling of the vehicle but that is able to be manufactured at a low cost.

Solution to Problem

As a means for solving the above-described problems, a vehicle door according to the present invention is characterized in that the vehicle door includes: a door body openably and closably mounted in a door opening of a vehicle body; a door sash fixed to the door body; and door glass received in the door sash, wherein the door sash includes: a receiving part having a U-shape in a cross sectional view and receiving the door glass; and an appearance-designed part provided at a vehicle outer side of the receiving part and disposed adjacent to an outer surface of a vehicle body around the door opening when the door body is closed, wherein the appearance-designed part includes an outside wall that is a wall part at a vehicle outer side of the receiving part, and an inclined wall that continuously extends from the outside wall toward a parting line of the outer surface of the vehicle body and inclining toward a vehicle inside as getting closer to the parting line, wherein when the door body is in a closed state, an outer surface of the outside wall is positioned more outside the vehicle than the parting line; and when the door body is in the closed state, a distal edge of the inclined wall is positioned more inside the vehicle than the parting line or included in a tangent plane to the outer surface of the vehicle body in a vicinity of the parting line.

With such a configuration, when the door body is in the closed state, the outer surface of the outside wall is positioned more outside the vehicle than the parting line of the vehicle (hereinafter referred to as requirement (a)). With such a configuration of the outside wall, the door glass having an area larger than the appearance-designed part of the door sash can be disposed close to the outer surface of the vehicle body, and thereby the flush feeling of the vehicle as a whole can be produced.

Note that the parting line is a line forming an outer shape (outline) of a region adjacent to the door opening in the vehicle body.

With the door body in the closed state, the distal edge of the inclined wall is positioned more inside the vehicle than the parting line of the vehicle body or included in the tangent plane to the outer surface of the vehicle body in the vicinity of the parting line (hereinafter referred to as a requirement (b)). Therefore, the distal edge of the inclined wall is inclining toward the vehicle inside as getting closer to the parting line, and thus becomes hard to view from the outside. As a result, even in a configuration in which the outside wall is positioned more outside the vehicle than the parting line, the outer surface of the appearance-designed part is suppressed from being viewed as projecting toward the vehicle outside, and thereby more flush feeling of the vehicle can be produced than before.

Further, there is no need of an additional part for producing flush feeling of the vehicle, and thus, the vehicle door can be manufactured at a low cost.

In addition, in the above-described vehicle door, it is preferable that when the door body is in the closed state and in a region along at least a roof of the vehicle body, the outer surface of the outside wall is positioned more outside the vehicle than the parting line, and that the distal edge of the inclined wall is positioned more inside the vehicle than the parting line or included in the tangent plane to the outer surface of the vehicle body in the vicinity of the parting line.

With such a configuration, the region along at least the roof is formed such that the outside wall satisfies the requirement (a) and the inclined wall satisfies the requirement (b). Accordingly, the manufacturing cost of the vehicle door can be reduced while producing the flush feeling of the vehicle.

In addition, in the above-described vehicle door, it is preferable that when the door body is in the closed state and further in a region along a pillar part, the outer surface of the outside wall is positioned more outside the vehicle than the parting line, and the distal edge of the inclined wall is positioned more inside the vehicle than the parting line or included in the tangent plane to the outer surface of the vehicle body in the vicinity of the parting line.

With such a configuration, in addition to the region along the roof, the region along the pillar part (front pillar and/or rear pillar) is formed such that the outside wall satisfies the requirement (a) and the inclined wall satisfies the requirement (b). Accordingly, the flush feeling of the vehicle can be effectively brought out.

In addition, in the above-described vehicle door, it is preferable that the outside wall is formed such that when the door body is in the closed state, a distance between a plane including the outer surface of the outside wall and the parting line becomes shorter as getting closer to a bottom edge of the pillar part.

With such a configuration, the door sash is formed such that the outer surface of the outside wall comes closer to the parting line as getting closer to the bottom edge of the pillar part. Accordingly, uncomfortable feeling is not given to a viewer even when a distance between the outside wall (or a plane including the outside wall) and the parting line in the region along the roof and a distance between the outside wall (or a plane including the outside wall) and the parting line in the vicinity of the bottom edge of the pillar part are different from each other.

In another aspect, the distance (difference in level) between the outer surface of the vehicle body and the outer surface of the appearance-designed part becomes smaller at the pillar part that is likely to be affected by the traveling wind, and thus, aerodynamic performance can be enhanced.

In addition, in the above-described vehicle door, it is preferable that the distal edge of the inclined wall is positioned more outside the vehicle than the outside surface of the door glass.

With such a configuration, the distal edge of the inclined wall is positioned more outside the vehicle than the outer surface of the door glass, and thus, there is no need to largely bend the inclined wall without other usage. Therefore, when light is irradiated to the outer surface of the appearance-designed part, uncomfortable feeling to a viewer can be prevented. Since there is no need to bend the inclined wall largely, manufacturing process is facilitated and thereby the productivity can be improved.

In addition, in the above-described vehicle door, it is preferable that the inclined wall starts to incline toward the vehicle inside at a joint portion continuous to the outside wall.

With such a configuration, when inclining a tangent plane in the vicinity of the distal edge of the inclined wall by a predetermined angle with respect to a tangent plane to the outer surface of the vehicle body in the vicinity of the parting line, bending of the inclined wall can be made small relatively to the conventional art by inclining the inclined wall inside the vehicle at the joint portion. Therefore, uncomfortable feeling to a viewer can be reduced compared with a case in which there is a steep change in the inclination angle of the inclined wall (change in the inclination angle when a tangent point between the inclined wall and the tangent plane thereto moves toward the distal edge of the inclined wall).

In many cases, the joint portion between the inclined wall and the outside wall is formed so as to have a relatively high rigidity. Thus, since a plate material is started to be bent at the joint portion of the high rigidity, the manufacturing process is facilitated and the productivity can be improved.

Advantageous Effects of Invention

The present invention allows providing a vehicle door that can be manufactured at a low cost and that exhibits the flush feeling of the vehicle.

DESCRIPTION OF EMBODIMENTS

Modes for carrying out the present invention (hereinafter referred as embodiments) are described in detail with reference to the accompanying drawings appropriately as needed.

Hereinafter, description is made, as an example, on a case that a front door FD and a rear door RD (see FIG. 1) are hinged doors. When describing a direction, a front direction is defined as a direction where a vehicle C travels forward, and an upward direction as a direction toward a top of the vehicle in a vertical direction, and thereby, top/bottom, front/rear, and the vehicle outside/inside directions are defined as illustrated in FIG. 2 and the like.

For example, when describing a left front door FD, the right side with respect to the front door FD is sometimes referred to as "vehicle inside", the left side with respect thereto as "vehicle outside", and the direction thereof as "an inside/outside direction of vehicle C".

<<Exemplary Embodiment>>
<Configuration of Vehicle Door>

Figure 1:
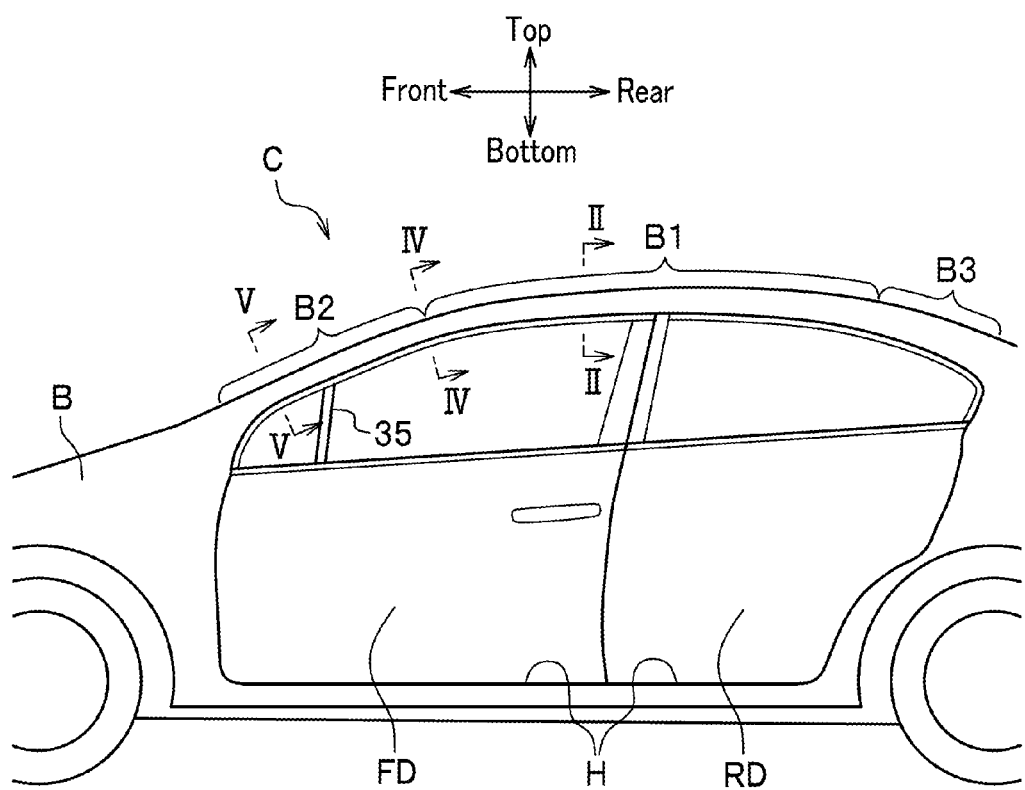
FIG. 1 is a left side view of a vehicle including a vehicle door according to an embodiment of the present invention.
Figure 2:
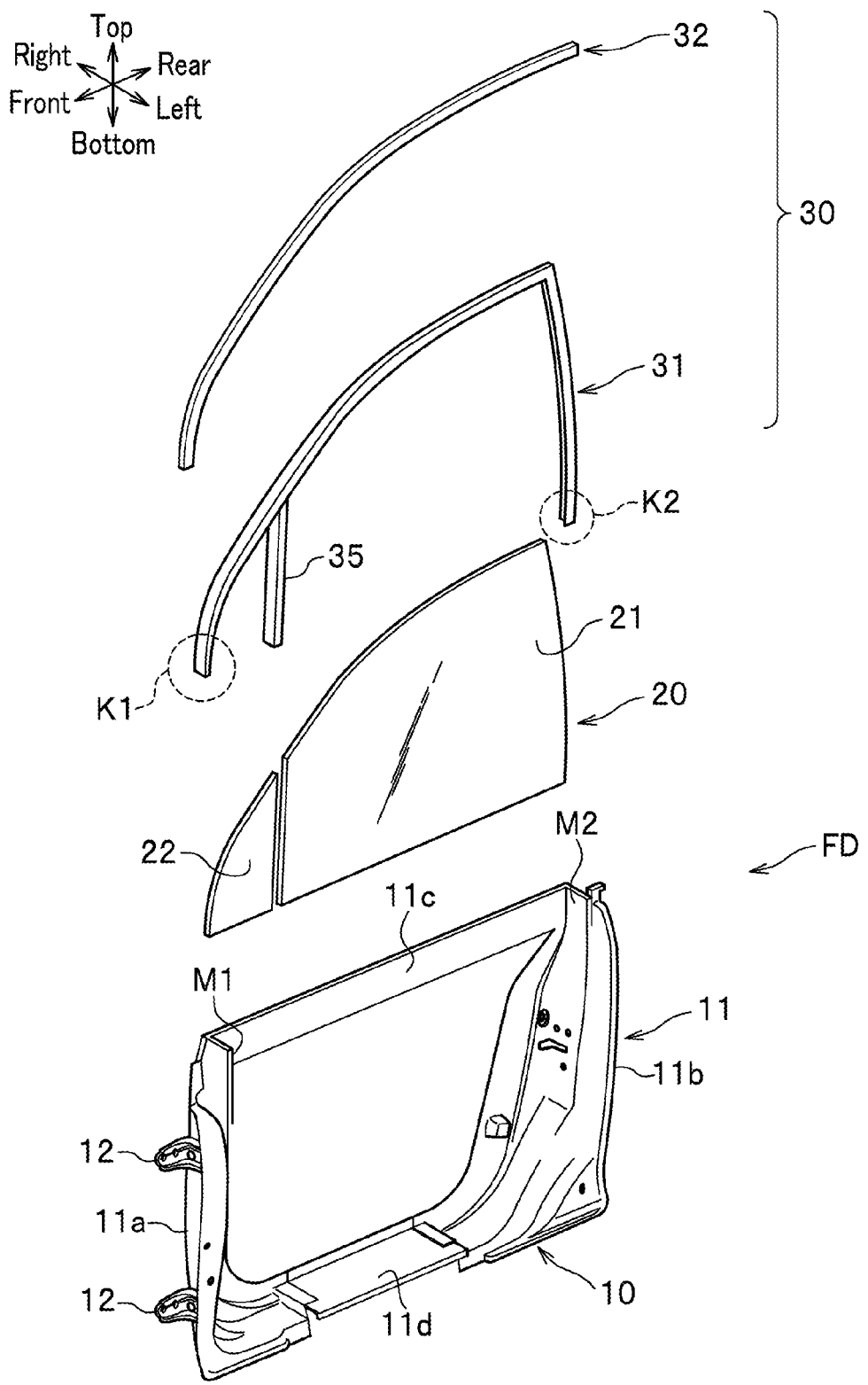
FIG. 2 is an exploded perspective view (a perspective view at the outside of the vehicle) of the vehicle door overlooked at the upper front left thereof.

FIG. 1 is a left side view of a vehicle including a vehicle door according to the embodiment. A front door FD and a rear door RD (vehicle doors) are doors openably and closably installed in a door opening H formed in a vehicle C. The door opening H is an opening formed on a vehicle body B according to an outer shape of the front door FD and rear door RD.

The vehicle C illustrated in FIG. 1 includes a pair of left and right front doors FD and a pair of left and right rear doors RD for the "vehicle doors". Hereinafter, a configuration of the left front door FD is described for an example.

FIG. 2 is an exploded perspective view (a perspective view at the outside of the vehicle) of a vehicle door overlooked at the upper front left side thereof. FIG. 2 omits an illustration of the run channel 40 and seal members 51, 52 (see FIG. 3) described below.

The front door FD includes a door body 10 openably and closably installed in the door opening H, a door sash 30 fixed to the door body 10, and door glass 20 housed in the door sash 30.

(Door Body)

The door body 10 is a member serving as a framework of the front door FD, and is mounted in the door opening H of the vehicle body B (see FIG. 1). A rotation of the door body 10 accompanying a rotation of a hinge 12 allows the front door FD open and close.

The door body 10 is formed of a metal such as steel and includes a frame 11 and the hinge 12. The frame 11 is formed, for example, by a front frame part 11a and a rear frame part 11b, which extend in the top/bottom direction, and an upper frame part 11c and a lower frame part 11d, which extend in the right/left direction. An outer panel (not illustrated) is fixed to the left side (vehicle outside) of the frame 11 with an adhesive.

The hinge 12 is a member for installing the door body 10 to be rotatable with respect to the vehicle body B (see FIG. 1).

(Door Glass)

The door glass 20 has a shape corresponding to the door sash 30 (for example, like a triangular window). The door glass 20 includes door glass 21 mounted into the door body 10 in a manner allowing free up and down movements) and door glass 22 (quarter glass) fixed into the door body 10. Note that FIG. 2 omits an illustration of an auxiliary sash 35 (see FIG. 1) partitioning the door glasses 21 and 22.

The door glass 20 is closely contact to an inner wall surface of the run channel 40 (see FIG. 3) in a closed state, and moves up and down while sliding on the run channel 40 accompanying a drive by the wind device (not illustrated).

The run channel 40 is an elastic member adapted to hold the door glass 20 and is held by a receiving part 314 described below (see FIG. 4B).

(Door Sash)

The door sash 30 has a feature of receiving an outer peripheral end part of the door glass 20 and holding the run channel 40 (see FIG. 3) and seal members 51, 52. As described above, a shape and assignment of the door sash 30 significantly affects the flush feeling (smoothness of the external shape) of the vehicle C. Therefore, in this embodiment, the door sash 30 is configured as described below in consideration of the appearance of the vehicle C.

The door sash 30 includes a receiving part 314 having a U-shape in a cross-sectional view for receiving the door glass 20 and an appearance-designed part provided at the vehicle outer side of the receiving part 314. In this embodiment, the "appearance-designed part" corresponds to a mold 32 illustrated in FIG. 3. With the door body 10 in a closed state, the appearance-designed part (mold 32) is adjacent to an outer surface of the vehicle body (roof B1 and front pillar B2, see FIG. 1) around the door opening H.

Hereinafter, first, description is made of a configuration of the sash body 31 including the receiving part 314, and then description is made of a configuration of the molding 32.

Figure 3:
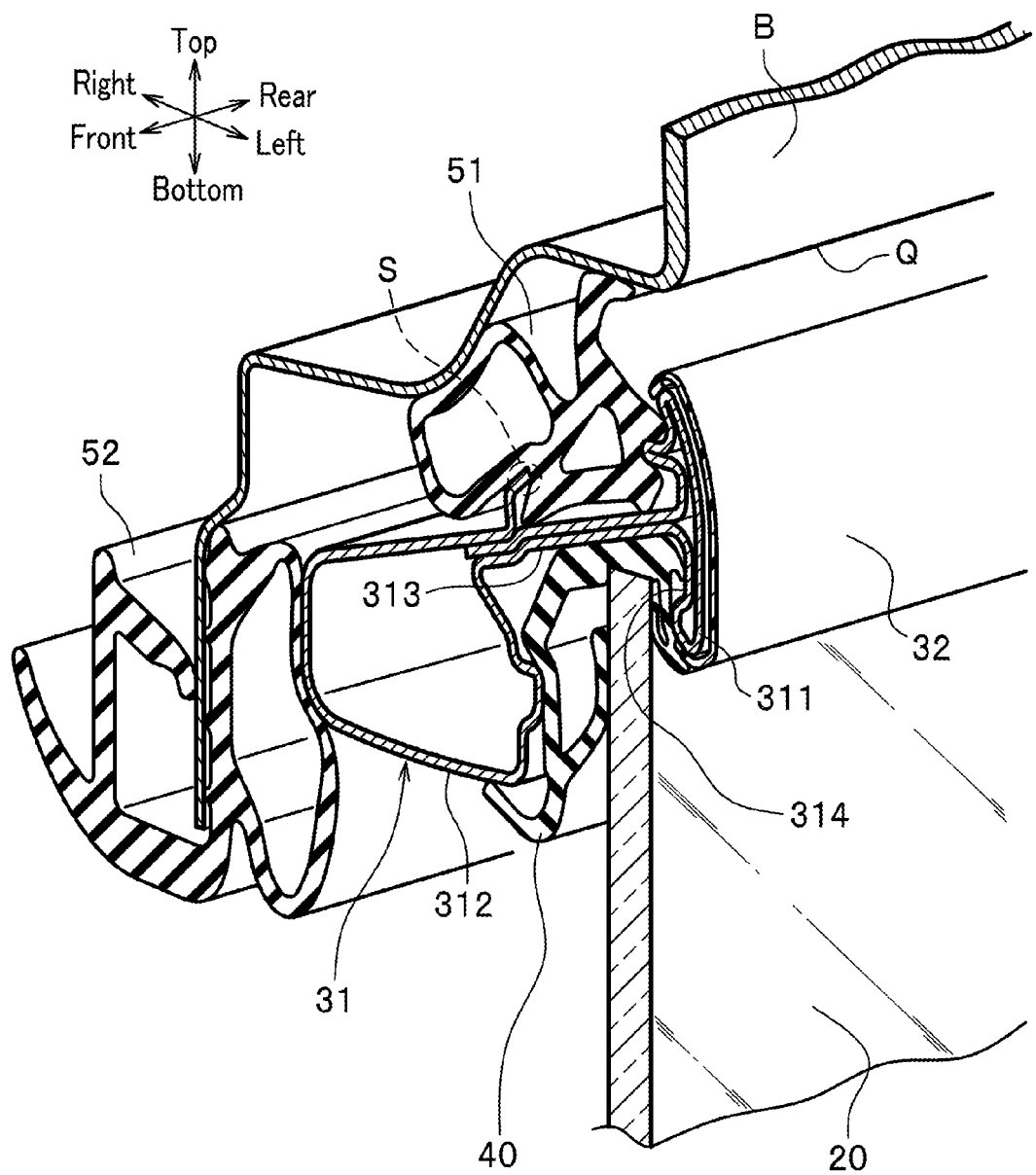
FIG. 3 is a cross-sectional perspective view of the vehicle door in a closed state when being cut at a line II-II illustrated in FIG. 1.

FIG. 3 is a cross-sectional perspective view of the vehicle door in a closed state when being cut at a line II-II illustrated in FIG. 1.

The sash body 31 is a polygonal-line-shaped frame fixed into an upper section of the door body 10 (see FIG. 2), and is manufactured, for example, by roll-forming a band-shaped plate material made of a rolled steel plate. The sash body 31 has its end portions K1, K2 welded to left and right sides M1, M2 of the upper frame member 11c (see FIG. 2).

The sash body 31 includes a flange part 311 covered with the molding 32, a tubular part 312 having a D-shaped closed cross section, and a joining portion 313 joining the flange part 311 to the tubular part 312. Note that a parting line Q illustrated in FIG. 3 is a line forming an outer shape (outline) of a region adjacent to the door opening H in the vehicle body B.

Figure 4A:
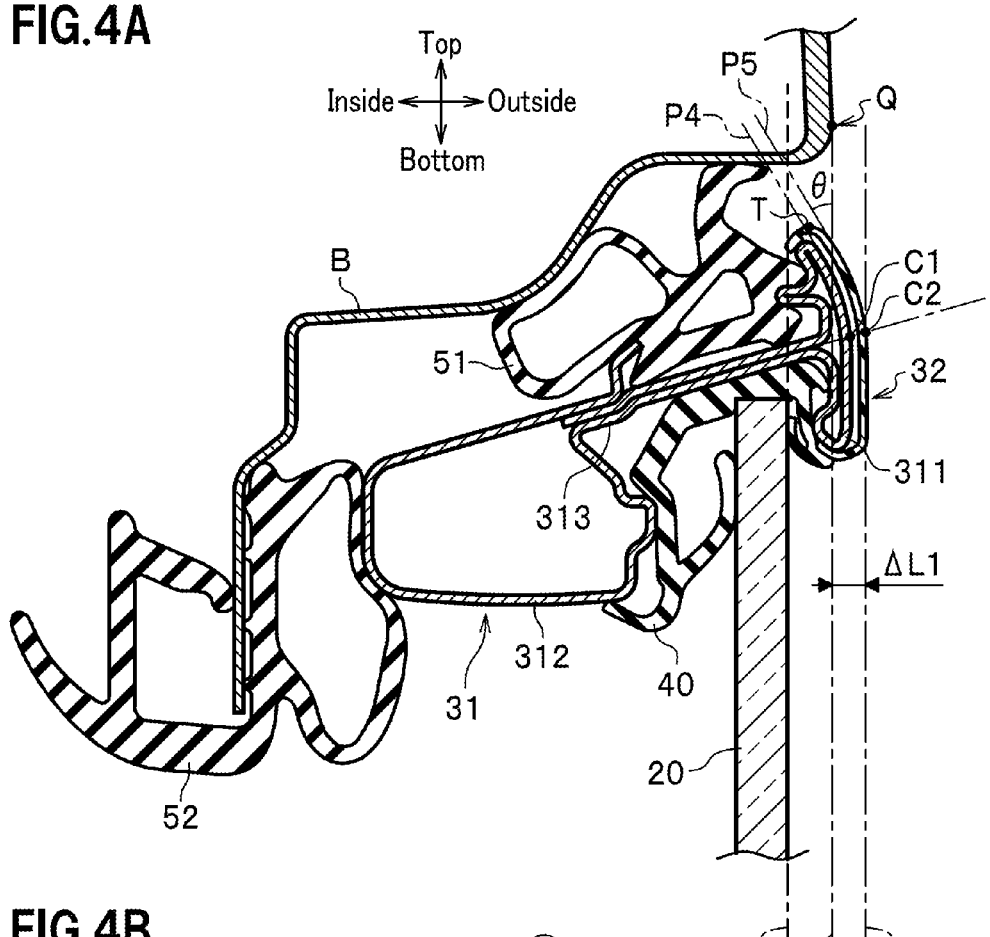
FIG. 4A is an end face view in an arrow direction at the line II-II illustrated in FIG. 1, illustrating the vehicle door in a closed state.

FIG. 4A is an end face view in the arrow direction at the line II-II indicated in FIG. 1, illustrating a closed state of the vehicle door. The flange part 311 has its outer surface covered with the molding 32 and is positioned more outside the vehicle than the tubular part 312 and the joining portion 313.

The flange part 311 has a flat closed cross section formed by roll forming. The flange part 311 is disposed more outside the vehicle than the door glass 20 and extends along the parting line Q of the door opening H formed on the vehicle body B.

Figure 4B:
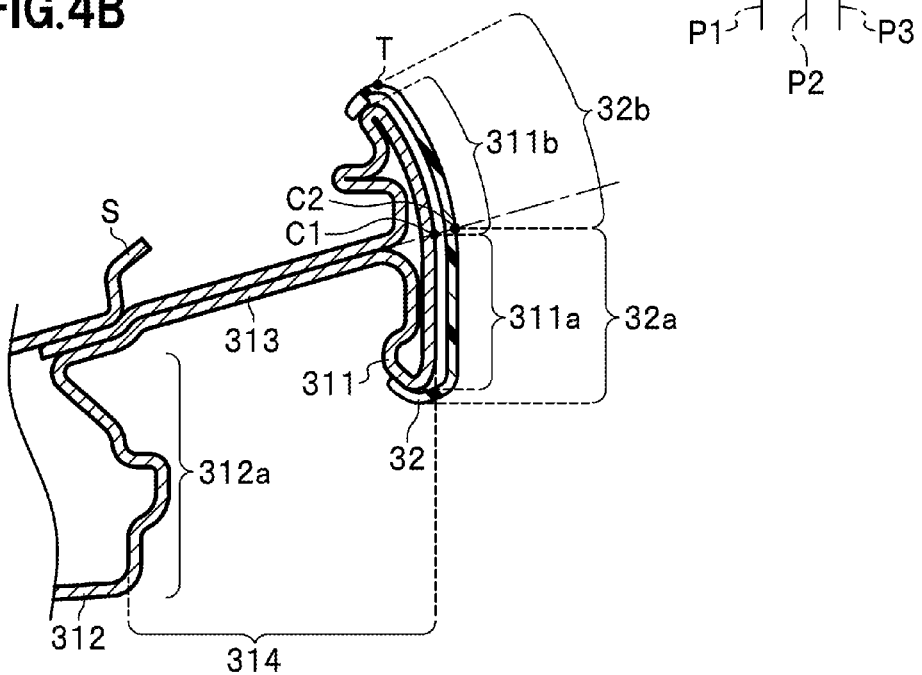
FIG. 4B is an end face view illustrating a portion of the sash body and a molding extracted from the end face view in the arrow direction at the line II-II of FIG. 4A.

As illustrated in FIG. 4B, the flange part 311 includes a first holding part 311a holding the run channel 40 of the door glass 20 in cooperation with the tubular part 312, and a second holding part 311b holding the seal member 51 in cooperation with an end portion S of a roll formed plate material.

The seal member 51 is an elastic member for sealing a gap between the door sash 30 and the vehicle body B in a closed state of the front door FD.

The first holding part 311a has an outer surface approximately in parallel with an outer surface (plane P1) of the door glass 20, and is positioned more outside the vehicle than the door glass 20. The first holding part 311a corresponds to an outside wall part included in the receiving part 314 having a U-shape in a cross-sectional view for holding the run channel 40.

Note that a tangent plane P2 illustrated in FIG. 4A is a tangent plane to the outer surface of the vehicle body at (in the vicinity of) the parting line Q. The tangent plane P2 according to this embodiment is approximately in parallel with the outer surface (plane P1) of the door glass 20.

The second holding part 311b continuously extends from the first holding part 311a to the parting line Q of the vehicle body B, and inclines toward the vehicle inside as getting closer from a joint portion C1 to the parting line Q. As illustrated in FIG. 4A, an angle formed by the tangent plane P2 and a tangent plane P4 on the outside wall surface of the second holding part 311b is referred to as an angle θ. The second holding part 311b is formed such that the angle θ becomes larger as the tangent point of the second holding part 311b with the tangent plane P4 is positioned more inside the vehicle.

Figure 7A:
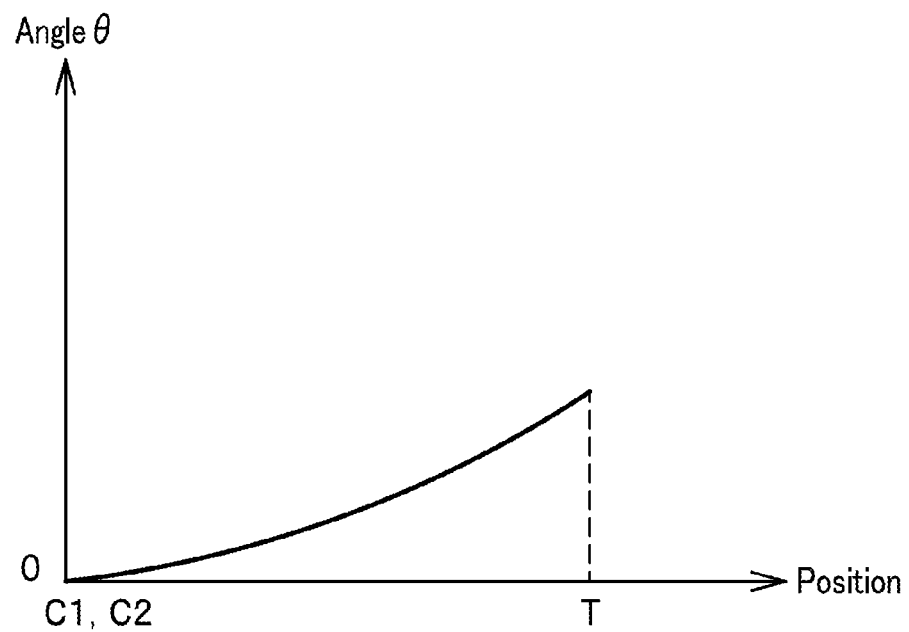
FIG. 7A is an illustrative diagram illustrating a change in an angle formed between a tangent plane to an inclined wall and a tangent plane to the outer surface of the vehicle body in the vicinity of the parting line in a region from a joint portion of the inclined wall to the edge thereof.

That is, as illustrated in FIG. 7A, the angle θ becomes larger from the position of the joint portion C1 (see FIG. 4A) of the first holding part 311a and the second holding part 311b toward an edge T. AS described above, by gradually increasing the angle θ toward the vehicle inside, the curvature of the second holding part 311b (eventually, the inclined wall 32b of the molding 32) is made smaller to allow easy forming of the flange part 311.

The joining portion 313 illustrated in FIG. 4A serves as a bottom wall with which end faces of the run channel 40 and the seal member 51 contact when the run channel 40 and the seal member 51 are fixed. The joining portion 313 has one end coupled to the flange part 311 and extending toward the vehicle inside, and another end coupled to the tubular part 312. The joining portion 313 is formed by making curved plate portions closely contact to each other when roll forming single sheet of the above-described plate material.

The tubular part 312 is provided to secure rigidity of the door sash 30 and is disposed so as to closely contact to the seal member 52 of the vehicle body B when the front door FD is in a closed state. The tubular part 312 has a D-shaped closed cross section and is formed such that the closed cross section projects toward the inside (downward in FIG. 4A) of the opening of the vehicle body.

The seal member 52 is attached to the vehicle body B such that a wall surface of the vehicular inner side of the tubular part 312 is pressed thereto when the front door FD is closed. The seal member 52 deforms elastically, and thereby provides a sealing performance doubled in cooperation with the seal member 51.

As illustrated in FIG. 4B, the receiving part 314 having the U-shape in a cross-sectional view is formed by a wall part 312a at the vehicle outer side of the tubular part 312, the joining portion 313, and the first holding part 311a. The receiving part 314 receives the door glass 20 through interposition of the run channel 40 so as to allow the door glass 20 to slide with the run channel 40.

The molding 32 (appearance-designed part) illustrated in FIG. 4A is a ornamental plate member installed along the parting line Q of the vehicle body B and covers the flange part 311 of the sash body 31 at the vehicle outside. The molding 32 is formed such that its inner wall surface runs along an outer wall surface of the flange part 311 in a cross-sectional view.

As illustrated in FIG. 4B, the molding 32 includes an outside wall 32a that is a wall part at the vehicle outer side of the receiving part 314, and an inclined wall 32b that is formed continuously along a side of the outside wall 32a, which side is a closer side to the parting line Q, and inclines toward the vehicle inside as getting closer to the parting line Q.

The outside wall 32a corresponds to the first holding part 311a of the sash body 31 in the vehicle outside/inside directions of the vehicle C. That is, the vehicle outside wall 32a extends to a place where the first holding part 311a is projected on the vehicle outside.

With the door body 10 in a closed state, a plane P3 including the outer surface of the outside wall 32a is positioned more outside the vehicle than the parting line Q. This allows disposing the door glass (in particular, an end portion close to an edge of the door opening H) more outside the vehicle than before. That is, a distance between the outer surface (plane P1) of the door glass 20 and the tangent plane P2 of the vehicle outer surface at the parting line Q can be reduced.

As described above, the door glass 20 having an overwhelmingly large area compared with the molding 32 is placed closer to the vehicle body B around the parting line Q, and thereby more flush feeling is able to be given to the vehicle C than before.

Note that an outer surface of the outside wall 32a which surface is close to an edge of the vehicle body opening (not illustrated) is preferably included in the plane P3. The plane P3 is a plane parallel to the tangent plane P2 and passing an outer surface of the joint portion C2, which allows suppressing the outer surface of the outside wall 32a from being viewed as projecting toward the vehicle outside, and thereby effectively bringing out flush feeling of the vehicle C.

The inclined wall 32b corresponds to the second holding part 311b of the sash body 31 in the vehicle outside/inside direction of the vehicle C, and inclines toward the vehicle inside as getting closer to the parting line Q. Here, refer to the angle formed between the tangent plane P2 to the outer surface of the vehicle body in the vicinity of the parting line Q and a tangent plane P5 to the inclined wall 32b as an angle θ (see FIG. 4A).

The inclined wall 32b is formed such that the angle θ becomes larger as the tangent point of the inclined wall 32b with the tangent plane P5 is positioned more inside the vehicle (see FIG. 7A). This allows for preventing a ridge line formed by the outside wall 32a and the inclined wall 32b standing out, and for smoothing a side surface of the molding 32 (eventually, vehicle C) in a cross-sectional view.

As illustrated in FIG. 4A, in a closed state of the door body 10 (see FIG. 2), the edge T of the inclined wall 32b is positioned more inside the vehicle than the parting line Q and more outside the vehicle than the outer surface (plane P1) of the door glass 20. Positioning the edge T of the inclined wall 32b more inside the vehicle than the parting line Q allows light irradiated on the edge T to be blocked by the vehicle body B, and thereby prevents the inclined wall 32b (molding 32) from unnecessarily standing out.

Positioning the distal edge of the inclined wall 32b more outside the vehicle than the outer surface of the door glass 20 eliminates a need to bend the inclined wall 32b largely toward the vehicle inside, resulting in the easier manufacturing process and the improved productivity of the door sash 30.

As illustrated in FIG. 4A, the inclined wall 32b starts to incline toward the vehicle inside at the joint portion C2 at which the inclined wall 32b is continuously joined to the outside wall 32a. That is, the inclined wall 32b is formed such that the angle θ is larger than 0 degree at the joint portion C2 and becomes larger as getting closer to the edge T of the inclined wall 32b in a cross-sectional view.

As described above, the bending radius of the inclined wall 32b may be increased relatively to otherwise (that is, bending angle is reduced) by inclining the inclined wall 32b toward the vehicle inside at the joint portion C2. Therefore, compared with a case in which the inclined wall 32b has a steep incline, the flush feeling of the front door FD is able to be brought out effectively.

Figure 5:
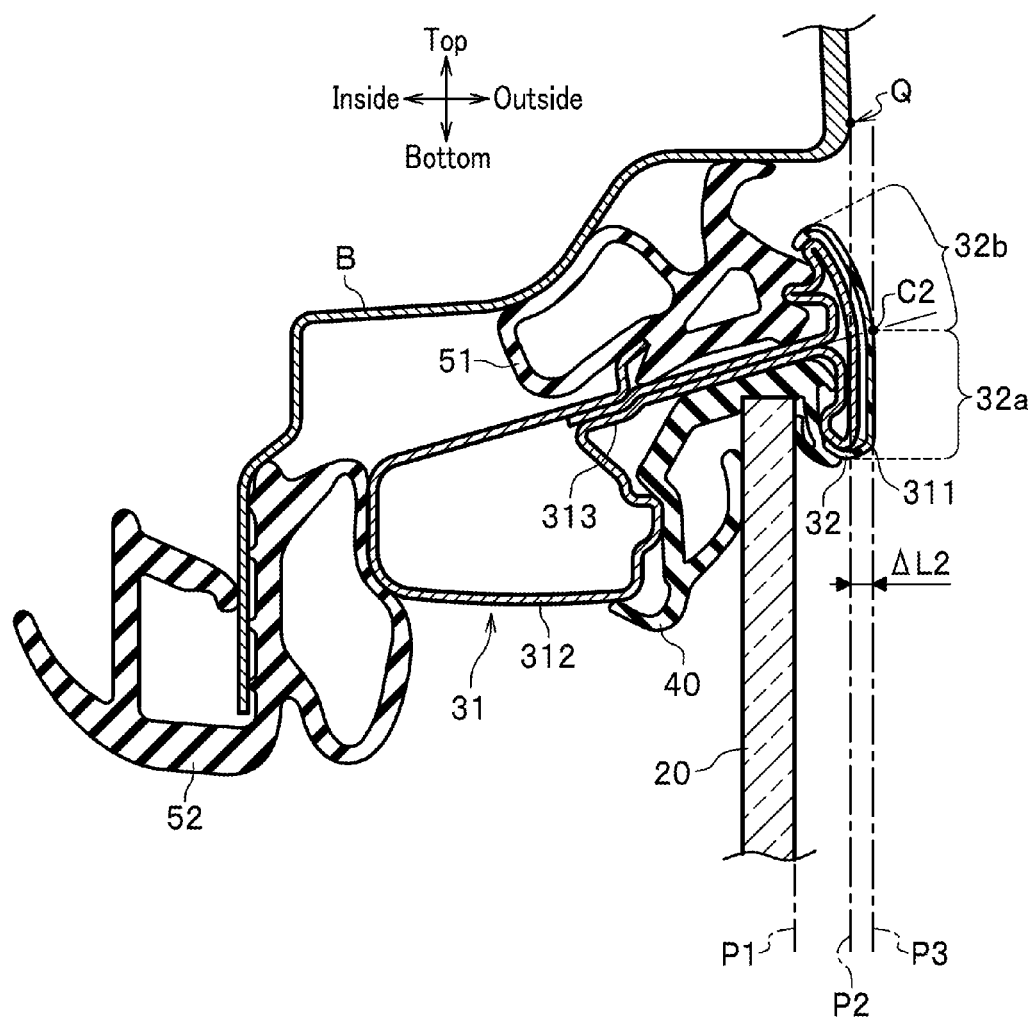
FIG. 5 is an end face view in the arrow direction at the line IV-IV of FIG. 1, illustrating the vehicle door in a closed state.

FIG. 5 is an end face view in the arrow direction at the line IV-IV illustrated in FIG. 1, illustrating a closed state of the vehicle door. The line IV-IV illustrated in FIG. 1 is positioned closer to a bottom edge of the front pillar B2 than the line II-II.

A configuration of each element illustrated in FIG. 5 corresponds to a configuration of each element illustrated in FIG. 4. In a closed state of the door body 10, the outer surface of the outside wall 32a is positioned more outside the vehicle than the parting line Q. A distance ΔL2 between the tangent plane P3 of the outside wall 32a illustrated in FIG. 5 and the tangent plane P2 of the outer surface of the vehicle body in the vicinity of the parting line Q is shorter than a distance ΔL1 illustrated in FIG. 4.

Figure 6:
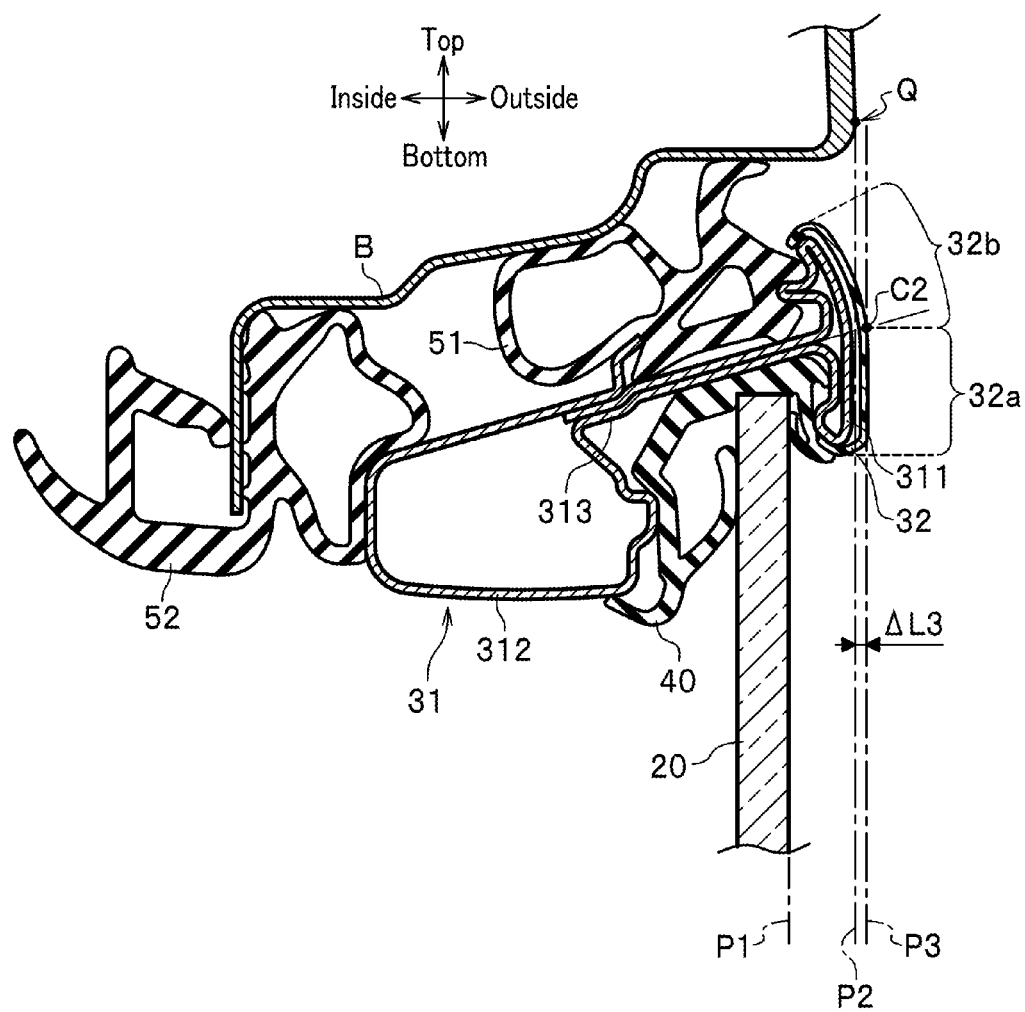
FIG. 6 is an end face view in the arrow direction at the line V-V of FIG. 1, illustrating the vehicle door in a closed state.

FIG. 6 is an end face view in the arrow direction at the line V-V illustrated in FIG. 1, illustrating the vehicle door in a closed state. The line V-V illustrated in FIG. 1 is positioned closer to the bottom edge of the front pillar B2 than the line IV-IV. A distance ΔL3 between the tangent plane P3 of the outside wall 32a illustrated in FIG. 6 and the tangent plane P2 of the outer surface of the vehicle body in the vicinity of the parting line Q is shorter than a distance ΔL2 illustrated in FIG. 5.

As illustrated in FIG. 2, both end portions K1, K2 in the vicinities of ends of the polygonal line-shaped door sash 30 in a side view are welded to right and left sides M1, M2 of the upper frame member 11c.

The sash body 31 has its end portions K1, K2 welded to left and right sides M1, M2 of the upper frame member 11c (see FIG. 2) Therefore, both end portions K1, K2 of the door sash 30 are preferably positioned more inside the vehicle than a position adjacent to the roof R1 (for example, line II-II illustrated in FIG. 1).

Figure 7B:
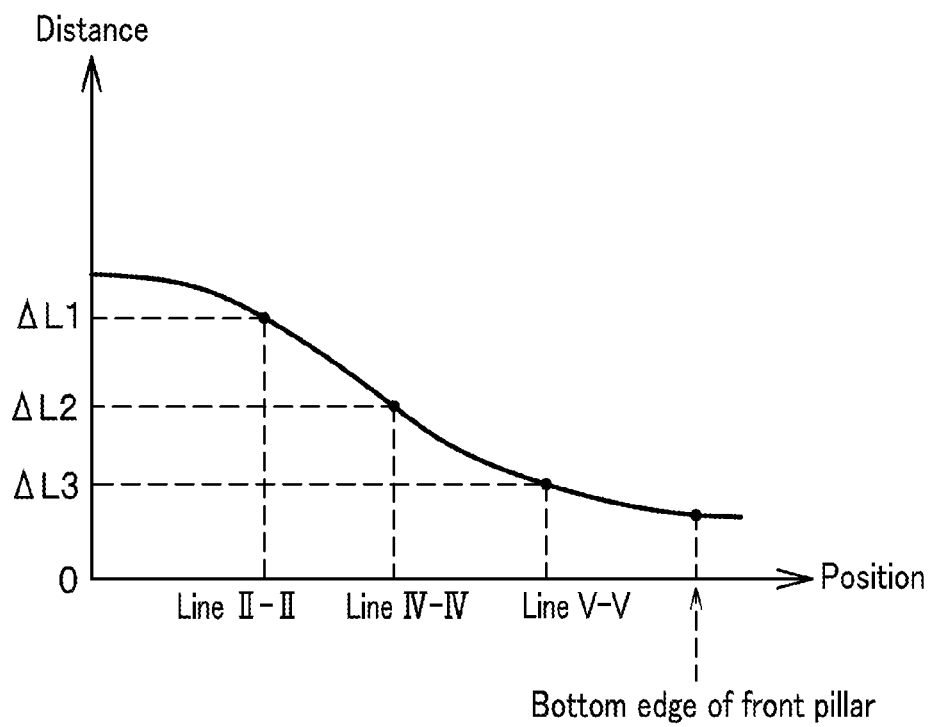
FIG. 7B is an illustrative diagram illustrating a change in a distance between the outer surface of the outside wall and the parting line in a region including the front pillar and the roof.

FIG. 7B is an illustrative diagram illustrating a change in the distance between the outer surface of the outside wall and the parting line in a region including the front pillar and the roof. Note that Lines such as "Line II-II" illustrated on the horizontal axis of FIG. 7B corresponds to the lines such as line II-II illustrated in FIG. 1.

As illustrated in FIG. 7B, the sash body 31 and the molding 32 are formed such that the distance between the outer surface of the outside wall 32a and the parting line Q decreases monotonously (ΔL1>ΔL2>ΔL3) as getting closer from the roof B1 to the lower end of the front pillar B2. As described above, uncomfortable feeling to a viewer is able to be avoided while satisfying the structural requirements by smoothly varying the distance between the outer surface of the outside wall 32a and the parting line Q.

<Advantageous Effects>

According to this embodiment, the door sash 30 is formed so as to satisfy the following requirements (a) and (b) in the whole area including the roof B1 and the front pillar B2.

(a) The outer surface (plane P3) of the outside wall 32a is positioned more outside the vehicle than the parting line Q.

(b) The edge T of the inclined wall 32b is positioned more inside the vehicle than the parting line Q.

The configuration satisfying (a) enables the door glass 20 to be positioned more outside the vehicle, and the distance between the tangent plane to the vehicle body B around the parting line Q and the door glass 20 to be smaller, than the conventional art.

And the configuration satisfying (b) eliminates a need to bend the inclined wall 32b largely toward the vehicle inside to facilitate the manufacturing process, and thereby achieves the improved productivity. Further, the uncomfortable feeling to a viewer is able to be prevented because the inclined wall 32b is not bent largely.

Furthermore, the door sash 30 is formed such that the distance between the outer surface of the outside wall 32a and the parting line Q decreases monotonously (ΔL1>ΔL2>ΔL3; see FIG. 7B). This prevents the uncomfortable feeling to a viewer while satisfying the above-described structural requirements.

In addition, the curvature of the molding 32 is able to be reduced comparing the conventional art by inclining the inclined wall 32b toward the vehicle inside at the joint portion C2 continuously connected to the outside wall 32a. In addition, the bending of the plate material starts at a position of a relatively rigid joint portion C2 (or the vicinity thereof), and thus, the molding 32 becomes easy to process, resulting the improved productivity.

<Modified Example>

The front door FD according to the present invention is described above. However, the present invention is not limited to the above-described embodiment and may be modified in various ways.

For example, in the above embodiment, the door sash 30 includes the molding 32. However, the present invention is not limited thereto. That is, the molding 32 may be eliminated from the door sash 30, and the outer surface of the flange part 311 of the door body 10 may be exposed.

In this case, the flange part 311 is formed integrally with the receiving part 314, and corresponds to "appearance-designed part" adjacent to the outer surface of the vehicle body around the door opening H in a closed state of the door body.

And in the flange part 311, the first holding part 311a corresponds to the "outside wall", and the second holding part 311b corresponds to the "inclined wall". In this case, this "outside wall" is formed so as to satisfy at least the above (a), and the "inclined wall" is formed so as to satisfy at least the above (b).

In addition, the above embodiment is explained on the case in which the edge T of the inclined wall 32b is positioned more inside the vehicle than the parting line Q, but the present invention is not limited thereto. That is, the inclined wall 32b may be formed such that the edge T may be included in the tangent plane P2 to the outer surface of the vehicle body in the vicinity of the parting line Q. Even in this case, light irradiated toward the edge T of the inclined wall 32b becomes easy to block with the vehicle body B, and thereby effects similar with the embodiment can be achieved.

In addition, the above embodiment is described of the case in which the door sash 30 is formed such that the above requirements (a) and (b) are satisfied in the whole area of the roof B1 and the front pillar B2, but the present invention is not limited thereto. For example, the door sash 30 may be formed such that the requirements (a) and (b) are satisfied only for any one of the roof B1 and the front pillar B2.

In addition, the above embodiment is described of the case in which the "vehicle door" is the front door FD (see FIG. 1), but the same also applies to the rear door RD. In this case, the door sash 30 is preferably formed such that the requirements (a) and (b) are satisfied in the whole area of the roof B1, front pillar B2, and rear pillar B3. Alternatively, the door sash 30 may be formed such that the requirements (a) and (b) are satisfied only for a portion in the roof B1, front pillar B2, and rear pillar B3.

In addition, the above embodiment is described of the case in which the distance between the outer surface of the outside wall 32a and the parting line Q is reduced as getting closer to the bottom edge of the front pillar B2, but the present invention is not limited thereto. For example, the distance between the outer surface of the outside wall 32a and the parting line Q may be approximately constant over the whole area of the roof B1 and front pillar B2.

In addition, the above embodiment is described of the case in which the edge T of the inclined wall 32b is positioned more outside the vehicle than the outer surface of the door glass 20, but the present invention is not limited thereto. That is, the edge T of the inclined wall 32b may be included in the plane P1 (see FIG. 4A) including the outer surface of the door glass 20. In this case, it is necessary to bend the inclined wall 32b largely relatively to the above embodiment, but the more flush feeling is able to be produced by burying the edge T of the inclined wall 32b inside the door opening H.

Further, the above embodiment is described of the case in which the inclined wall 32b is inclined toward the vehicle inside at the joint portion C2 illustrated in FIG. 4A, but the present invention is not limited thereto. That is, a position closer to the edge T of the inclined wall 32b than the joint portion C2 may be a starting point of the inclination.

In addition, the above embodiment is described of the case in which a hinge door is used as the vehicle door, but the present invention is not limited thereto. That is, the present invention may be applied to doors such as a slide door.

In the above embodiment, it is described of the case in which, the whole area of the door sash 30 is roll formed, but the present invention is not limited thereto. For example, a portion of the door sash 30 extending in a polygonal line-shape taken in the side view may be manufactured by roll forming, and the remaining portion thereof may be manufactured by press forming.

REFERENCE SIGNS LIST

C vehicle
FD front door (vehicle door)
RD rear door (vehicle door)
10 door body
20 door glass
30 door sash
31 sash body
311 flange part (appearance-designed part)
311a first holding part (outside wall)
311b second holding part (inclined wall)
312 tubular part
312a wall part of tubular part closer to outside
313 joining portion
314 receiving part
32 molding (appearance-designed part)
32a outside wall
32b inclined wall
40 run channel
B vehicle body
B1 roof
B2 front pillar (pillar part)
B3 rear pillar (pillar part)
H door opening
Q parting line
P2 tangent plane

We claim:

1. A vehicle door comprising:
    a door body adapted to be openably and closably mounted in a door opening of a vehicle body, the vehicle body including a parting line of an outer surface of the vehicle body, the parting line defining an outer shape of a region adjacent to the door opening;
    a door sash adapted to be fixed to the door body; and
    door glass adapted to be received in the door sash, wherein
    the door sash includes:
        a receiving part adapted to have a U-shape in a cross sectional view and to receive the door glass; and
        an appearance-designed part adapted to be provided at a vehicle outer side of the receiving part and disposed adjacent to the outer surface of the vehicle body around the door opening when the door body is closed, wherein
    the appearance-designed part includes:
        an outside wall that is a wall part at a vehicle outer side of the receiving part; and
        an inclined wall that continuously extends from the outside wall toward the parting line of the outer surface of the vehicle body and inclines toward a vehicle inside as getting closer to the parting line, wherein
    an outer surface of the outside wall is positioned outside a tangent plane extending tangentially from the outer surface of the vehicle body at the parting line when the door body is in a closed state; and
    a distal edge of the inclined wall is positioned inside the tangent plane or included in the tangent plane when the door body is in the closed state.

2. The vehicle door according to claim 1 wherein
    when the door body is in the closed state, in a region at least along a roof of the vehicle body,
        the outer surface of the outside wall is positioned outside the tangent plane; and
        the distal edge of the inclined wall is positioned inside the tangent plane or included in the tangent plane.

3. The vehicle door according to claim 2, wherein
    when the door body is in the closed state, and further in a region along a pillar part,
        the outer surface of the outside wall is positioned outside the tangent plane, and
        the distal edge of the inclined wall is positioned inside the tangent plane or included in the tangent plane.

4. The vehicle door according to claim 3, wherein
    the outside wall is adapted to be formed such that a distance between a plane including the outer surface of the outside wall and the tangent plane becomes shorter toward a bottom edge of the pillar part, when the door body is in the closed state.

5. The vehicle door according to claim 1, wherein
    the distal edge of the inclined wall is positioned outside an outside surface of the door glass.

6. The vehicle door according to claim 2, wherein
    the distal edge of the inclined wall is positioned outside an outside surface of the door glass.

7. The vehicle door according to claim 3, wherein
    the distal edge of the inclined wall is positioned outside an outside surface of the door glass.

8. The vehicle door according to claim 4, wherein
    the distal edge of the inclined wall is positioned outside an outside surface of the door glass.

9. The vehicle door according to claim 1, wherein
    the inclined wall starts to incline toward the vehicle inside at a joint portion continuously joining to the outside wall.

10. The vehicle door according to claim 2, wherein
    the inclined wall starts to incline toward the vehicle inside at a joint portion continuously joining to the outside wall.

11. The vehicle door according to claim 3, wherein
    the inclined wall starts to incline toward the vehicle inside at a joint portion continuously joining to the outside wall.

12. The vehicle door according to claim 4, wherein
    the inclined wall starts to incline toward the vehicle inside at a joint portion continuously joining to the outside wall.

13. The vehicle door according to claim 5, wherein
    the inclined wall starts to incline toward the vehicle inside at a joint portion continuously joining to the outside wall.

14. The vehicle door according to claim 6, wherein
    the inclined wall starts to incline toward the vehicle inside at a joint portion continuously joining to the outside wall.

15. The vehicle door according to claim 7, wherein the inclined wall starts to incline toward the vehicle inside at a joint portion continuously joining to the outside wall.

16. The vehicle door according to claim 8, wherein the inclined wall starts to incline toward the vehicle inside at a joint portion continuously joining to the outside wall.

* * * * *